United States Patent [19]
Kanayama

[11] Patent Number: 5,719,762
[45] Date of Patent: Feb. 17, 1998

[54] METHOD OF CONTROLLING A VEHICLE TO MAKE A COMBINATION OF ARBITRARY TRANSLATIONAL AND ROTATIONAL MOTIONS

[75] Inventor: Yutaka John Kanayama, Salinas, Calif.

[73] Assignee: The United States of America as represented by the Secretary of the Navy, Washington, D.C.

[21] Appl. No.: 553,904

[22] Filed: Nov. 6, 1995

[51] Int. Cl.[6] .......................... G06F 165/00; B62D 61/12
[52] U.S. Cl. ........................ 364/424.027; 364/424.028; 364/424.051; 180/248; 180/249; 180/411; 180/6.62; 318/568.19
[58] Field of Search .................. 364/424.027, 424.028, 364/424.029, 424.031, 424.051, 424.052, 424.098; 180/248, 249, 411, 413, 421, 422, 6.48, 6.6, 6.62, 8.7; 318/568.12, 568.19

[56] References Cited

U.S. PATENT DOCUMENTS

| | | | |
|---|---|---|---|
| 5,097,329 | 3/1992 | Hassegawa | 348/171 |
| 5,186,270 | 2/1993 | West | 180/6.62 |
| 5,213,176 | 5/1993 | Oroku et al. | 180/168 |
| 5,307,419 | 4/1994 | Tsujino et al. | 382/153 |

*Primary Examiner*—Tan Q. Nguyen
*Attorney, Agent, or Firm*—Donald E. Lincoln; William C. Garvert

[57] ABSTRACT

A method of controlling a rotary vehicle to navigate a heading using a combination of translational and rotational motions by a plurality of driving-steering wheels controlling the motion in three degrees of freedom for a manned or unmanned vehicle having at least two drive-steering wheels, wherein a drive-steering wheel is a wheel with its heading orientation and driving velocity positively controlled, wherein a global motion is a vehicle trajectory with vehicle orientation from the initial position (with orientation) to a final destination (with orientation), which comprises comparing a global motion selected to the vehicle's body position and orientation to compute a motion instruction in three degrees of freedom, the acceleration, path of curvature, and rotation rate, collectively known as the motion command then converting the motion command into a translational speed, a translational direction, and a rotational rate and converting the translational speed, the translational direction and the rotational rate into the direction and driving speed for each independent drive-steering wheel.

2 Claims, 9 Drawing Sheets

METHOD OF CONTROLLING A VEHICLE TO MAKE A COMBINATION OF ARBITRARY TRANSLATIONAL AND ROTATIONAL MOTIONS

BACKGROUND OF THE INVENTION

1. Field of the Invention

This invention pertains to manned or unmanned wheeled vehicles which can move on a flat or moderately tilted surface. More precisely, this invention involves controlling the direction, speed and rotation of manned or unmanned vehicles.

2. Description of the Related Art

Automobiles, bicycles, tricycles, and differential drive type vehicles are "normal" vehicles where we can define their heading (front) orientation in a natural way. In such vehicles, the heading orientation is always equal to the tangent orientation of its trajectory (See FIG. 1). We call these types of motions tangential motions. Thus, when such a vehicle's trajectory is determined, the heading orientation is subordinately determined as the trajectory's tangent orientation at every point. These vehicles do not have a rotational degree of freedom.

In order to enable a vehicle to have a rotational degree of freedom, it has been understood that a special wheel mechanism is needed. One method is using wheels with passive rollers. An omni-directional vehicle constructed by Professor Leifer at Stanford University is one of them (FIGS. 2A and 2B). This type of wheel produces forces in the wheel's orientation, but not in the normal orientation to it. By this property, it can embody an arbitrary combination of translational and rotational motions. However, no vehicle architectures have been known to make a vehicle with normal wheels operate with an arbitrary combination of translational and rotational motions.

OBJECTIVES OF THE INVENTION

It is an object of this invention to provide a means for controlling a vehicle's direction of travel with any type of control motions possible, in addition to normal tangential motions. For example, the vehicle can be controlled to rotate at an arbitrary rotational rate while it is translating, to keep its vehicle orientation constant while it is translating, to control its heading orientation so that it is always orientated to a fixed point on the ground while it is translating, to smoothly stop with its final position and orientation independently specified, and to smoothly move from a stationary position following a combination of translational and rotational motions. In order for a vehicle to make these motions possible, the vehicle is equipped with at least two drive-steering wheels. A drive-steering wheel is a wheel having its heading orientation and driving velocity each independently positively controlled. A vehicle which has at least two drive-steering wheels and is controlled in the method described herein is called a "rotary vehicle."

It is a further object of this invention to provide the means for obtaining better traction of a wheeled vehicle while controlling the vehicle's direction of travel. Using the methods described herein of controlling the vehicle's direction of travel results in the drive-steering wheels producing positive traction for the precise forces and torques needed to embody the vehicle's body motion in three degrees of movement, where three degrees of movement means speed and orientation of translational motion, plus a rotational rate. The composite forces produced by the drive-steering wheels generate the required body translational motion in the correct orientation, and the composite moment about the vehicle's body center generates the rotational motion. The vehicle may even use thicker tires and/or jagged tires to gain more traction.

It is a third objective of this invention to provide the means for controlling a vehicle which possesses better movability both on paved roads and natural terrains. It is not desirable to run tracked vehicles on paved roads, because of the possibility of damaging the roads. Since this invention proposes controlling vehicles with conventional tires, the vehicle will travel at a high rate of speed on natural terrain as well as on a paved road without damaging it.

An additional object of this invention is to provide the means for controlling a vehicle's direction of travel in rotational and tangential movements without the need for a separate, additional rotating platform being mounted on a conventional tangential-motion vehicle platform. The method described herein eliminates the possibility that a rotational platform could obstruct sensors or other equipment which are necessary for directional information feedback to the controller. The method of this invention allows for lighter vehicles to be constructed without complex couplings between a rotating platform and the non-holonomic vehicle platform. Additionally, there is no need to provide power for the torque necessary to turn a rotational platform, resulting in a more efficient method of performing the required tasks.

LIST OF ADVANTAGES OF THE INVENTION

It is expected that this rotary vehicle can be used in any number of unmanned or manned scenarios, including military armament vehicles that must traverse various terrain while constantly being oriented to attack enemy positions and land mine hunting/searching and clearing. Additional uses include working with radioactive substances. Other uses include police and fire department support in cases of emergencies when normal vehicle operations are limited. This vehicle can also perform automatic material transfer tasks in manufacturing environments. This vehicle can perform any motions possible in a two-dimensional plane. The vehicle does not need any backing-up motion to navigate in tight working spaces. Since these versatile motions with three degrees of freedom are embodied by ordinary wheels, finer motion control is expected on this vehicle than one by tracked vehicles, vehicles using roller-equipped-wheels, or other special mechanisms.

Glossary

The following glossary of elements refer to the skematic representation of a Rotary Vehicle's Control Architecture (see FIG. 6) having the following elements:

F—COMPUTER/HUMAN OPERATOR
G—VEHICLE'S MOTION INSTRUCTION
H—MOTION INSTRUCTION CONVERTER
Q—MOTION COMMAND
I—WHEEL MOTION TRANSLATOR
J—WHEEL MOTOR-DRIVERS
K—DRIVE MOTORS
L—DRIVE-STEERING WHEEL
M—SHAFT ENCODERS
N—DEAD RECKONING ROUTINE
P—NEW POSITION
Ψ—NEW HEADING ORIENTATION

DESCRIPTION OF THE PREFERRED EMBODIMENT

Figure 1:
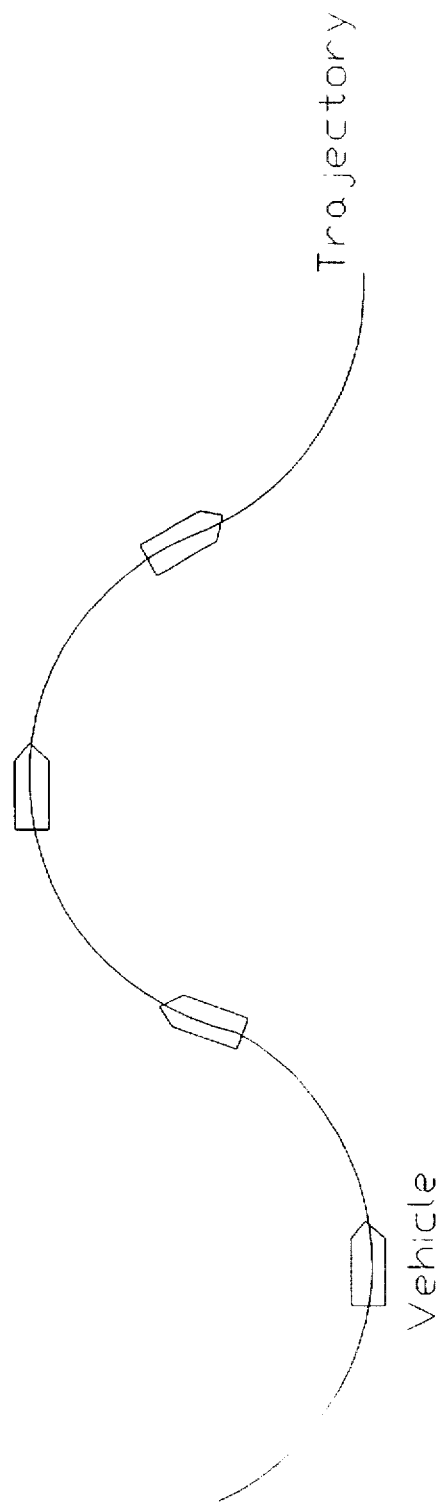
FIG. 1 depicts a normal vehicle's heading orientation equal to the tangent orientation of its trajectory.
Figures 2A, 2B:
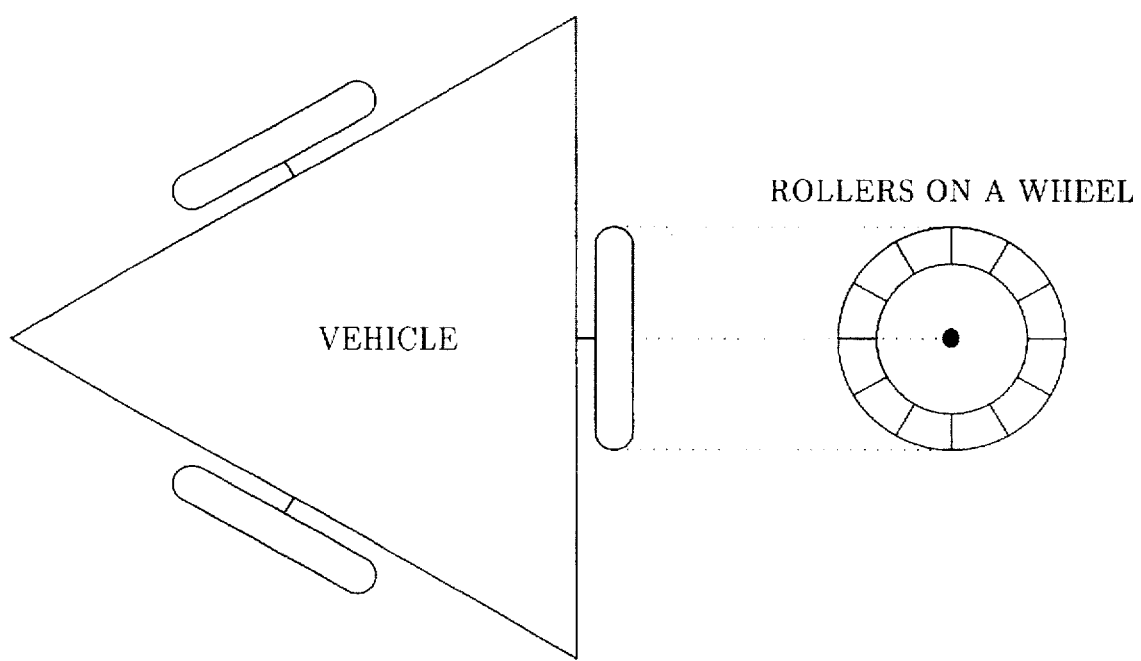
FIG. 2A depicts a three-wheeled vehicle utilizing roller-equipped wheels constructed by Professor Leifer at Stanford University.
FIG. 2B is a side view depiciting rollers on the wheels.
Figure 3:
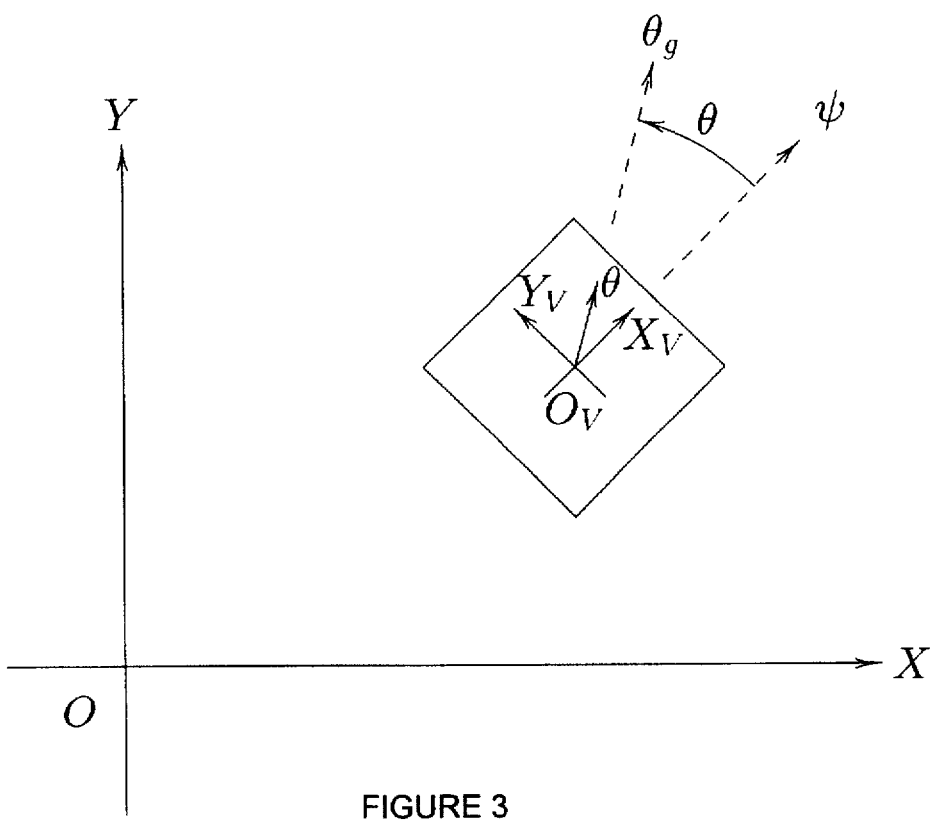
FIG. 3 depicts the principle of the global and vehicle coordinate systems.

A global coordinate system is a two-dimensional stationary Cartesian coordinate system depicting the world, O, X, and Y in FIG. 3. A vehicle coordinate system, with its origin $O_v$, and both axes, $X_v$ and $Y_v$, is a two-dimensional Cartesian coordinate system attached to the vehicle so that this coordinate system moves when the vehicle moves, as shown in relation to the global coordinate system. A global motion orientation $\theta_g$ is the orientation of the vehicle translational motion in the global coordinate system. The global motion orientation $\theta_g$ is in turn converted into the moving orientation $\theta$ in the vehicle coordinate system by subtracting the vehicle's current heading orientation Ψ.

Figure 4:
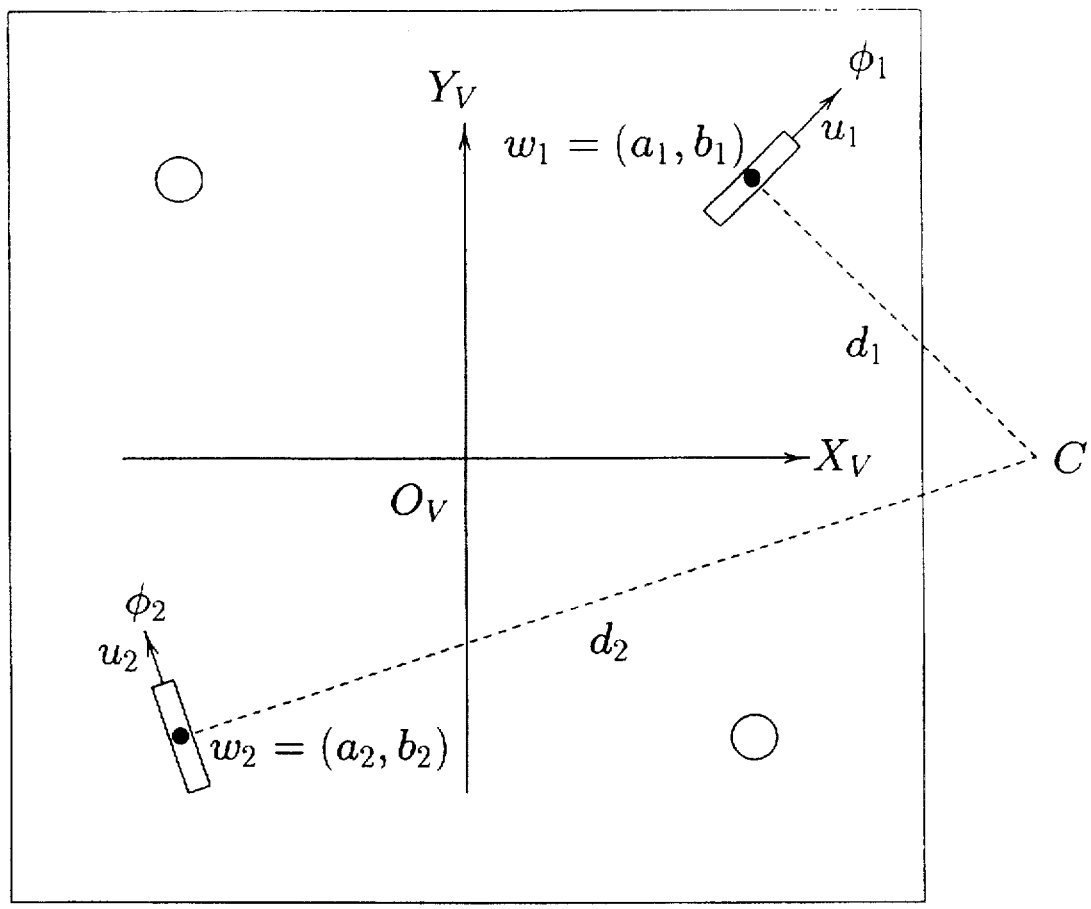
FIG. 4 depicts a rotary vehicle with two independent drive-steering wheels and two caster wheels for stability.

If there are two drive-steering wheels on a vehicle, as shown in FIG. 4, the center C of rotation is the intersection of the two wheel axes. If the axes are parallel [not shown], but not the same line, the center C of rotation is at the infinity point and the vehicle is purely translating. If the axes are parallel and are the same, the center C of rotation can be an arbitrary point on that axis. Furthermore, the speeds, $u_1$ and $u_2$, of both wheels are proportional to the distances, $d_1$, $d_2$, between the wheels and the center C of rotation. Therefore, both wheel speeds, $u_1$ and $u_2$, cannot be independent. As a conclusion, among the four control variables possessed by two drive-steering wheels, only three (two orientational variables, $\phi_1$ and $\phi_2$, and one speed variable, $u_1$ or $u_2$) are independent.

In FIG. 4, the vehicle has two independent drive-steering wheels each with two degrees of freedom: (a) each drive-steering wheel has a motor to control it's local orientation, $\phi_i$, and (b) each control wheel has a motor to control it's independent speed, $u_i$, against the ground (i=1,2). Two passive wheels are also mounted in the vehicle for static balancing, but they play only a passive role in the vehicle's motion control.

Figure 5:
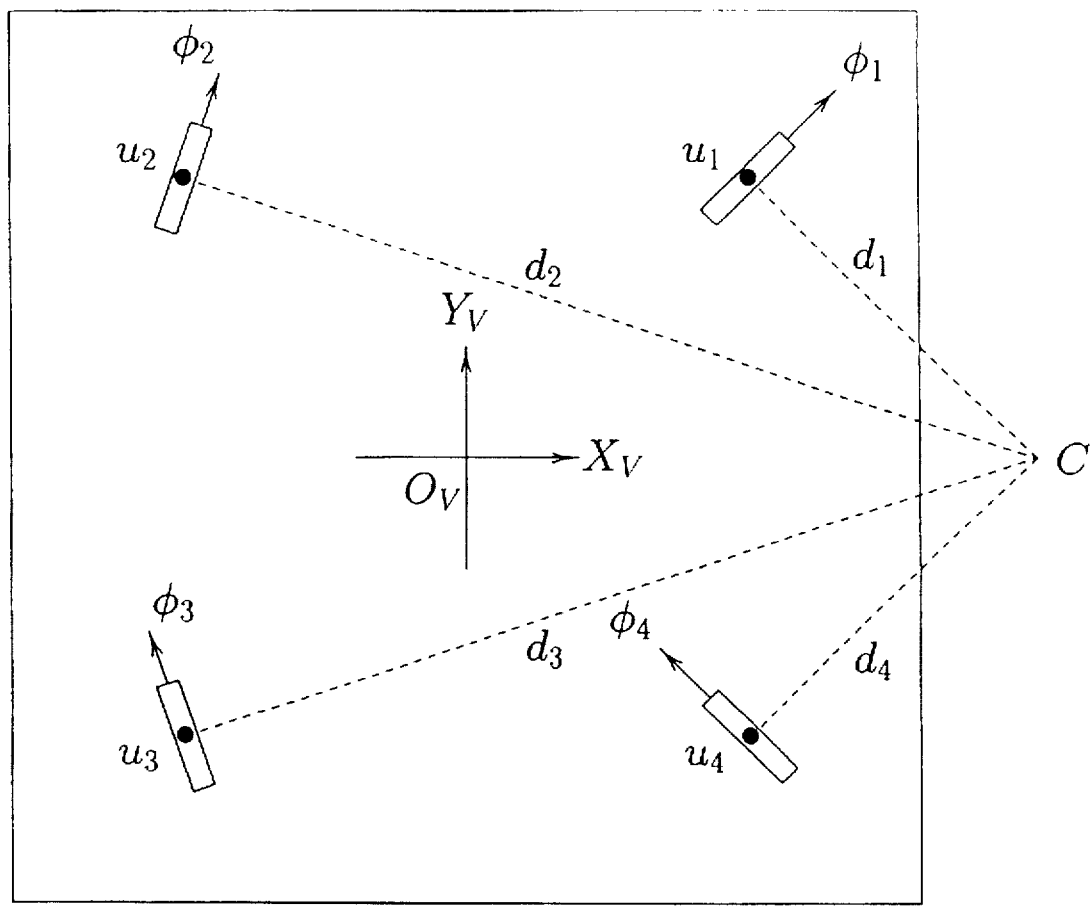
FIG. 5 depicts a rotary vehicle with four drive-steering wheels.

If there are more than two drive-steering wheels (n wheels) on a vehicle, (See FIG. 5) the center C of rotation is determined by the intersection of any two drive-steering wheel axes, chosen arbitrarily. The other wheels' orientation, $\phi_i$, are subordinately determined in such a way that their drive-steering wheel axes must pass through the center C of rotation. Therefore, only two orientations, $\phi_i$ and $\phi_j$ among all orientations, are independent. Each wheel's speed $u_i$ is proportional to the distance $d_i$ from the center C of rotation to the wheel. Therefore, only one speed $u_i$ can be independently determined and all others are subordinately determined. As a conclusion, among the 2n control variables possessed by the n drive-steering wheels, only three (two orientational variables, $\phi_i$ and $\phi_j$, and one speed variable, $u_k$) are independent.

Figure 6:
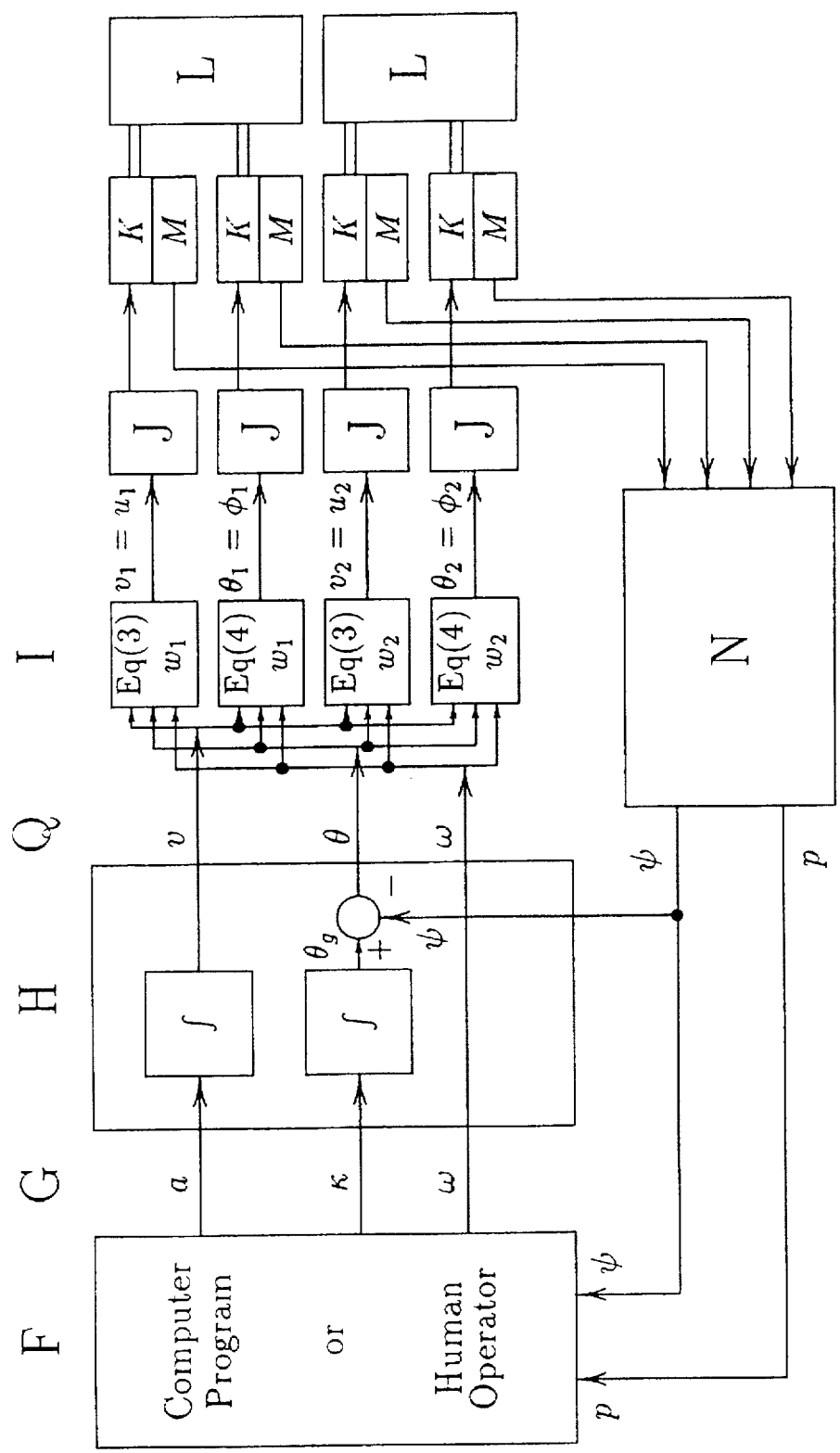
FIG. 6 is a schematic diagram of one example of a rotary vehicle's control architecture.

FIG. 6 shows one example of a control architecture for a rotational vehicle with two drive-steering wheels. The vehicle is controlled by F, a computer or a human operator. A rotary vehicle's motion instruction G is a triple (α, κ, ω), where α is an acceleration, κ a path curvature, and ω a rotational rate. In a conventional vehicle there are only two degrees of freedom: acceleration α and curvature κ, where ω (rotational rate) is dependent on α and κ. Thus the rotary vehicle using the method of this invention has an extra degree of freedom, ω (rotational rate).

This rotary vehicle's motion instruction G (α, κ, ω) is converted by a motion instruction converter H which takes the motion instruction input G (α, κ, ω) and outputs a motion command Q=(υ, θ, ω), where υ is a translational speed, θ a translational motion orientation in the vehicle's coordinate system, and ω a rotational rate at any given sampling time. The motion instruction converter H integrates the acceleration α to obtain the speed υ. It also integrates the curvature κ to obtain the global motion orientation $\theta_g$.

Figure 7:
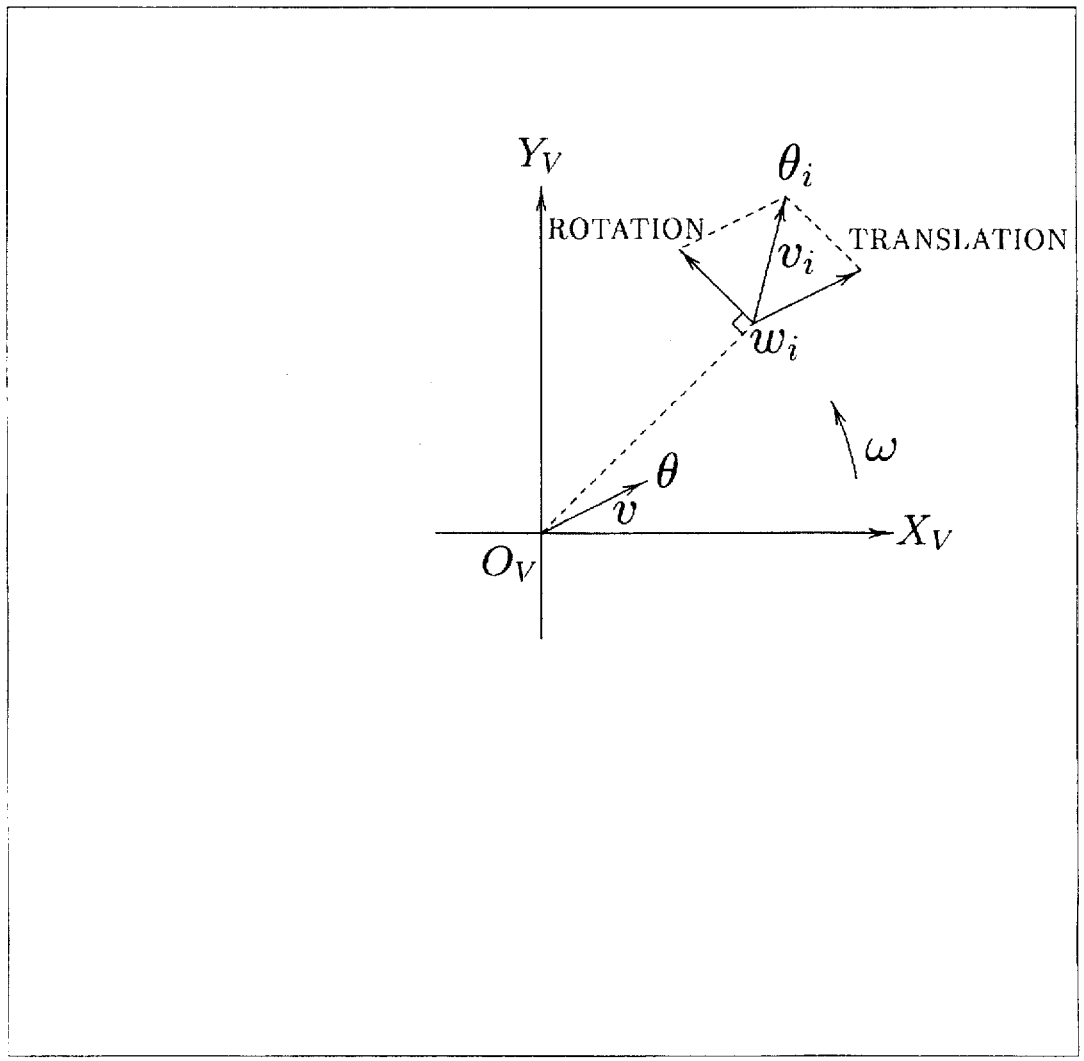
FIG. 7 depicts the incremental motion of a rotary vehicle at a drive-steering wheel at any given time.
Figure 8:
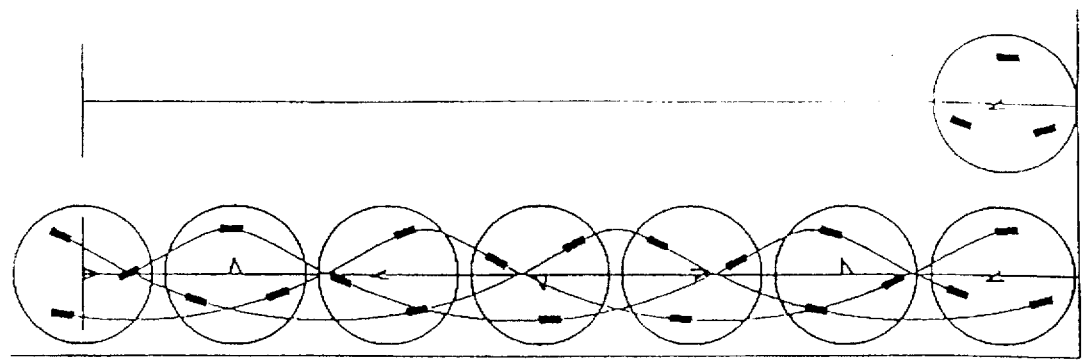
FIG. 8 illustrates the results of a test on a Computer Generated Rotary Vehicle Simulator showing a composite motion from left to right of straight translation at 400 cm/sec. and rotation at 5 radians/sec. of a rotary vehicle with three drive-steering wheels whose positions are 40 cm off the vehicle center.
Figure 9:
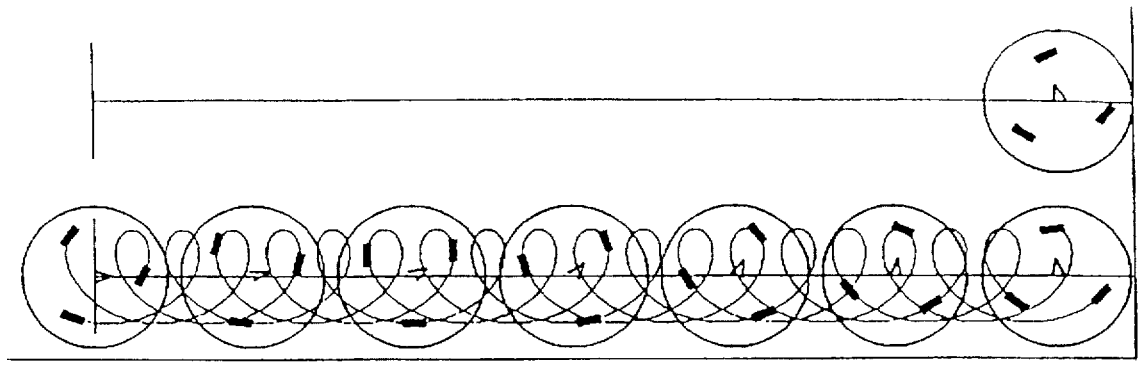
FIG. 9 illustrates the results of a test on a Computer Generated Rotary Vehicle Simulator showing a composite motion from left to right of straight translation at 200 cm/sec. and rotation at 10 radians/sec. of a rotary vehicle with three drive-steering wheels whose positions are 40 cm off the vehicle center.
Figure 10:
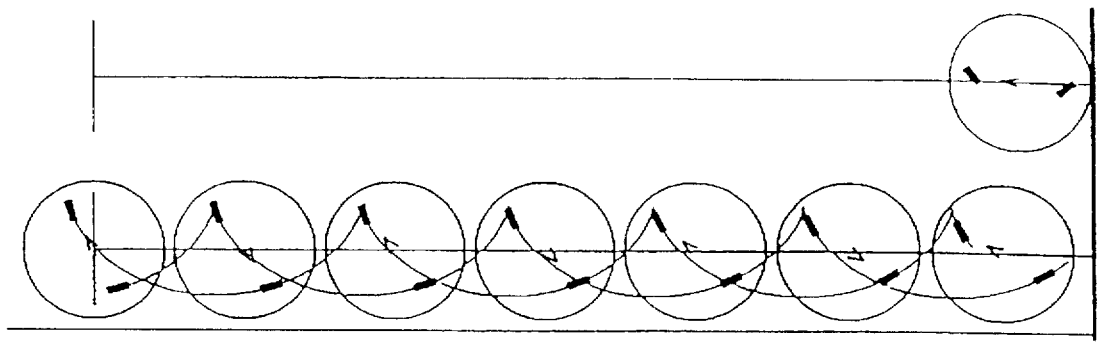
FIG. 10 illustrates the result of a test on a Computer Generated Rotary Vehicle Simulator showing a composite motion from left to right of straight translation at 400 cm/sec. and rotation at 10 radians/sec. of a rotary vehicle with two drive-steering wheels whose positions are 40 cm off the vehicle center.
Figure 11:
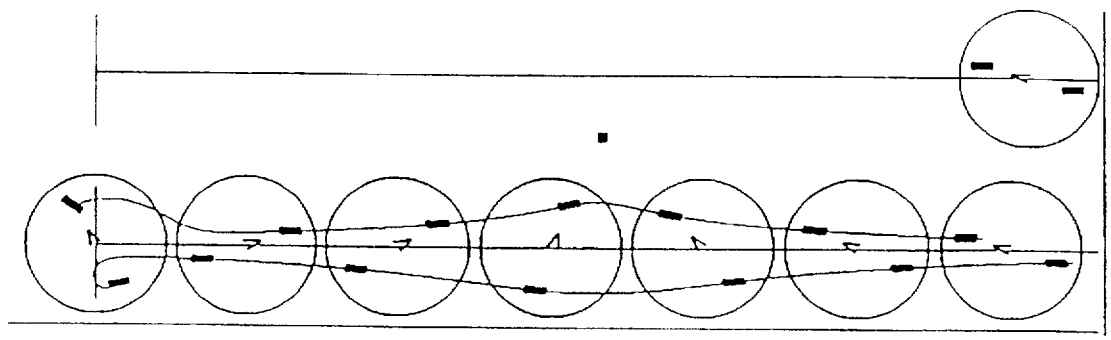
FIG. 11 illustrates the result of a test on a Computer Generated Rotary Vehicle Simulator showing a two drive-steering wheeled rotary vehicle from left to right which maintains an orientation such that the vehicle is always pointing at a fixed target depicted by a small black square on the horizon while the vehicle continues to move at a translational speed of 400 cm/sec. Initially the vehicle's heading is not at the target and the vehicle rotates to adjust it's heading in order to constantly point at the target as it is translating.

As further shown in FIG. 6, the motion command Q is input to the wheel motion translator I. Let $w_i=(a_i,b_i)$, (i=1,2), be each drive-steering wheel's position in the vehicle coordinate system. This wheel motion translator I computes how the wheel position $w_i$ on the vehicle moves by Q as shown in FIG. 7.

$$\upsilon_{i,x}=\upsilon \cos\theta - b_i\omega, \qquad (1)$$

$$\upsilon_{i,y}=\upsilon \sin\theta + a_i\omega. \qquad (2)$$

Then the point $w_i$ moves at a speed vector of $\upsilon_i=(\upsilon_{i,x}, \upsilon_{i,y})$, where $\upsilon_{i,x}$ and $\upsilon_{i,y}$ are its x and y components respectively (i=1,2). Therefore, the control wheel's motion speed $v_i$ becomes $$v_i = \sqrt{(v_{i,x})^2 + (v_{i,y})^2} = \sqrt{(v\cos\theta - b_i\omega)^2 + (v\sin\theta + a_i\omega)^2} \quad (3)$$

Furthermore, the motion orientation $\theta_i$ of $w_i$ in the vehicle coordinate system (i=1,2) becomes $$\theta_i = a \tan 2(v_{i,y}, v_{i,x}) = a \tan 2(v \sin \theta + a_i\omega, v \cos \theta - b_i\omega), \quad (4)$$

if $v_i \neq 0$. Thus, the vehicle's wheel motion translator I has computed the magnitude $v_i$ and local orientation $\theta_i$ of the translational motion at each drive-steering wheel position, $w_i$.

Referring back to FIG. 6, we take the strategy that the drive-steering wheel's speed $u_i$ and local orientation $\phi_i$ be set equal to the motion speed $v_i$ and orientation $\theta_i$ at each wheel position respectively:

$$u_i = v_i \text{ and } \phi_i = \theta_i, \quad (5)$$

for i=1,2. By this control method, the vehicle's motion will be equal to the motion command Q. It is interesting to note that although two drive-steering wheels possess four control variables ($u_1$, $\phi_1$, $u_2$, $\phi_2$), all of them are not totally independent, because these values are eventually determined by the three degrees of freedom of Q ($v$, $\theta$, $\omega$).

The commanded orientations, $\phi_1$ and $\phi_2$, and speeds, $u_1$ and $u_2$, to the two drive-steering wheels are fed to the wheel motor-drivers J, which in turn activate drive motors K. The two drive motors K activate each drive-steering wheels L of the vehicle. The drive motors K incremental motions are detected through shaft encoders M, which generate the "counts" representing the drive motors K incremental rotation amounts. The counts go to a dead reckoning routine N which evaluates the vehicle's new position p and heading orientation $\Psi$ at this sampling time. The new position p is fed back to the computer/human operator F. The heading orientation $\Psi$ is fed back to the motion instruction converter H and the computer/human operator F.

Thus, it can be seen that the human operator or computer selects a global motion and initializes the vehicle controller and the drive motors for the global motion to the final destination. As the vehicle translates and rotates towards the destination, the controller gathers data from the shaft encoders of the drive motors to compute a new heading orientation and a new position of the vehicle over the ground for each drive-steering wheel, which is actually equal to a dead reckoning computation. The computer or human operator then compares the original global motion to the vehicle's present body position and orientation to generate a new motion command (instruction) in the three degrees of freedom, acceleration, a path curvature, and a rotational rate. These control variable are then converted into the translational speed, the translational direction, and the rotational rate. The motion command is then converted into a new direction and a new driving speed for each drive-steering wheel. The direction and driving speed for each drive-steering wheel is then converted into two motor commands for each drive-steering wheel and sent to two motors for each wheel, a directional controlling motor and a speed controlling motor. The computer or human operator continues to receive orientational and incremental motion information constantly as the vehicle traverses over the surface towards the destination, constantly updating motion commands until the final objecive is accomplished.

It is well understood by those skilled in the art that in addition to a rotary vehicle with two drive-steering wheel, a rotary vehicle with three or more independent drive-steering wheels is possible, using the disclosed information to construct such a rotary vehicle. Each drive-steering wheel's speed $u_i$ and orientation $\phi_i$ can be computed in the same way, using Equation (5), with the wheel's local positions $w_i$, for i=1, . . . . . In the case of a vehicle with three or more drive-steering wheels, it does not need any caster wheels since it is statically balanced.

It appears that it is not meaningful to have more than two drive-steering wheels to obtain motions with a minimum number of motors. However, having more wheels, and consequently more motors, contributes to obtaining stronger traction and to make the motion more robust. Therefore, even though a smaller number of wheels is more economical, that fact is not controlling when the terrain or obstacles to be overcome are considered.

Obviously many modifications and variations of the present invention are possible in light of the above teachings. It is, therefore, to be understood that the present invention may be practiced within the scope of the claims other than as specifically described.

EXPERIMENTS

A computer was programmed to test the feasibility of rotational and translational motion. FIGS. 8–11 show the results of variations of translational and rotational speeds programmed into the computer.

Test number 1, (FIG. 8), illustrates the results of a Computer Generated Rotary Vehicle Simulator showing a composite motion of straight translation at 400 centimeters per second (cm/sec.) and rotation at 5 radians per second (radians/sec.) of a rotary vehicle with three drive-steering wheels whose positions are 40 centimeters (cm) off the vehicle center.

Test number 2, (FIG. 9,) illustrates the results of a Computer Generated Rotary Vehicle Simulator showing a composite motion of straight translation at 200 cm/sec. and rotation at 10 radians/sec. of a rotary vehicle with three drive-steering wheels whose positions are 40 cm off the vehicle center.

Test number 3, (FIG. 10), illustrates the result of a Computer Generated Rotary Vehicle Simulator showing a composite motion of straight translation at 400 cm/sec. and rotation at 10 radians/sec. of a rotary vehicle with two drive-steering wheels whose positions are 40 cm off the vehicle center.

Test number 4, (FIG. 11), illustrates the result of a Computer Generated Rotary Vehicle Simulator showing a two drive-steering wheeled rotary vehicle which maintains an orientation such that the vehicle is always pointing at a fixed target on the horizon while the vehicle continues to move at a translational speed of 400 cm/sec. Initially the vehicle's heading is not at the target and the vehicle rotates to adjust it's heading in order to constantly point at the target as it is translating.

What is claimed is:

1. A method of controlling the motion in three degrees of freedom for a manned or unmanned vehicle having at least two drive-steering wheels, wherein a drive-steering wheel is a wheel with its heading orientation and driving velocity positively controlled, wherein a global motion is a vehicle trajectory with vehicle orientation from the initial position (with orientation) to a final destination (with orientation), which comprises:

(a) comparing a global motion selected to the vehicle's body position and orientation to compute a motion instruction in three degrees of freedom, the acceleration, path curvature, and rotation rate, collectively known as the motion command;

(b) converting the motion command into a translational speed, a translational direction, and a rotational rate; and (c) converting the translational speed, the translational direction and the rotational rate into the direction and driving speed for each independent drive-steering wheel.

2. A method of controlling the motion in three degrees of freedom for a manned or unmanned vehicle having at least two drive-steering wheels, wherein a drive-steering wheel is a wheel with its heading orientation and driving velocity positively controlled, wherein a global motion is a vehicle trajectory with vehicle orientation from the initial position (with orientation) to a final destination (with orientation), which comprises:

(a) selecting the desired type of a global (body) motion in three degrees of freedom for the vehicle;

(b) initializing the vehicle controller and drive motors;

(c) repeating a sequence of operations at a constant time interval until the global motion is completed, where the sequence comprises:

(d) sensing the shaft encoders of the drive motors to compute the new heading orientation and the incremental motion against the ground on each drive-steering wheel;

(e) computing the vehicle's incremental translational and rotational motion by the results of step (d);

(f) computing the vehicle's updated body position and orientation from the results of step (e);

(g) comparing the global motion selected in step (a) to the vehicle's updated body position and orientation resulting from step (f) to compute a motion instruction in three degrees of freedom, the acceleration, path curvature, and rotation rate, collectively known as the motion command;

(h) converting the motion command into the translational speed, the translational direction, and the rotational rate;

(i) converting the translational speed, the translational direction and the rotational rate into the direction and driving speed for each independent drive-steering wheel;

(j)) converting the direction and driving speed into two separate motor commands for each drive-steering wheel;

(k) sending the two commands to two motors for each wheel;

(l) returning to step (d) if the global motion is not completed; and (m) stopping the vehicle when the global motion is completed.

* * * * *